US012739712B2

(12) United States Patent
Padhi et al.

(10) Patent No.: US 12,739,712 B2
(45) Date of Patent: Sep. 15, 2026

(54) METHOD AND SYSTEM FOR PERFORMING EFFICIENT CELL SEARCH IN CELLULAR NETWORKS USING IRAT FREQUENCIES

(71) Applicant: SAMSUNG ELECTRONICS CO., LTD., Suwon-si (KR)

(72) Inventors: Aditya Kumar Padhi, Bengalaru (IN); Isakkiraja Isakki, Bengalaru (IN); Shrinath Ramamoorthy Madhurantakam, Bengalaru (IN); Arunakumar Bettappanavar, Bengalaru (IN); Deepak Rajendran, Bengalaru (IN); Sathia Chandrane Sundararaju, Bengalaru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 303 days.

(21) Appl. No.: 18/240,179

(22) Filed: Aug. 30, 2023

(65) Prior Publication Data

US 2024/0073749 A1 Feb. 29, 2024

(30) Foreign Application Priority Data

Aug. 30, 2022 (IN) ............................ 202241049618

(51) Int. Cl.
*H04W 36/00* (2009.01)
*H04W 36/32* (2009.01)

(52) U.S. Cl.
CPC ... *H04W 36/0061* (2013.01); *H04W 36/0072* (2013.01); *H04W 36/322* (2023.05)

(58) Field of Classification Search
None
See application file for complete search history.

(56) References Cited

U.S. PATENT DOCUMENTS

| | | | | |
|---|---|---|---|---|
| 8,886,241 | B2 | 11/2014 | Yang et al. | |
| 10,893,448 | B2 | 1/2021 | Panchal et al. | |
| 2016/0057686 | A1* | 2/2016 | Yang | H04W 36/0088 370/332 |
| 2019/0215888 | A1* | 7/2019 | Cirik | H04W 72/0446 |
| 2019/0357116 | A1* | 11/2019 | Huang-Fu | H04W 48/02 |

(Continued)

FOREIGN PATENT DOCUMENTS

| | | | | |
|---|---|---|---|---|
| WO | 2018/017840 A1 | | 1/2018 | |
| WO | WO-2022022416 A1 | * | 2/2022 | H04W 36/0083 |

*Primary Examiner* — Brandon M Renner
(74) *Attorney, Agent, or Firm* — Sughrue Mion, PLLC

(57) ABSTRACT

Provided is a method for performing a cell search operation that includes: determining whether a User Equipment (UE) is camped on a first Radio Access Technology (RAT) among a plurality of RATs and supports camping on a second RAT; acquiring first information corresponding to a first Public Land Mobile Network Identity (PLMN ID) associated with the first RAT and at least one first inter-RAT (IRAT) frequency, the at least one first IRAT frequency being associated with the first RAT; storing the first information corresponding to the first PLMN ID in a database of the UE; detecting an occurrence of one or more first events indicating that the UE is required to leave the first RAT and camp on another RAT to handle the event; performing the cell search operation corresponding to the first PLMN ID based on the stored first information to camp the UE on the second RAT.

18 Claims, 13 Drawing Sheets

(56) References Cited

U.S. PATENT DOCUMENTS

| | | | | |
|---|---|---|---|---|
| 2020/0022054 | A1* | 1/2020 | Hong | H04B 17/391 |
| 2020/0322863 | A1* | 10/2020 | Wang | H04W 36/0079 |
| 2021/0092621 | A1* | 3/2021 | Shih | H04W 48/20 |
| 2021/0289404 | A1* | 9/2021 | Tseng | H04W 48/18 |
| 2022/0086747 | A1* | 3/2022 | Bucknell | H04W 48/18 |
| 2022/0360962 | A1* | 11/2022 | Tseng | H04W 8/183 |
| 2023/0388886 | A1* | 11/2023 | Huang | H04W 36/0088 |
| 2025/0142431 | A1* | 5/2025 | Lee | H04W 48/20 |

* cited by examiner

FIG. 7

METHOD AND SYSTEM FOR PERFORMING EFFICIENT CELL SEARCH IN CELLULAR NETWORKS USING IRAT FREQUENCIES

CROSS-REFERENCE TO RELATED APPLICATION(S)

This application is based on and claims priority under 35 U.S.C. § 119 to Indian Provisional Application No. 202241049618, filed on Aug. 30, 2022, in the Indian Patent Office, the disclosure of which is incorporated herein by reference in its entirety.

BACKGROUND

1. Field

The disclosure relates to the field of wireless communication networks, and more specifically to a method and system for performing efficient cell search in cellular networks using inter-radio access technology (IRAT) frequencies.

2. Description of Related Art

The need for seamless and efficient connectivity in wireless communication systems has driven the evolution of radio access technology (RAT) and the development of mechanisms to facilitate RAT change in user equipment (UE). As wireless networks have advanced and new generations of technology, such as 3$^{rd}$ generation (3G), 4$^{th}$ generation (4G), and 5$^{th}$ generation (5G), have emerged, there has been a growing demand for UEs to seamlessly transition between different RATs while maintaining uninterrupted communication.

Generally, the RAT change may occur in the UE for various reasons such as, but not limited to, out-of-service (OOS) recovery, circuit switch fallback (CSFB), and evolved packet service fallback (EPSFB) without redirection from a network. To expedite the camping on to a network, UE can perform stored cell search based on the previously camped frequencies.

In the related art, if the stored search procedure fails, a full band scan procedure is initiated. The full band scan procedure involves an extensive search procedure performed by the UE to detect and evaluate all available RATs in its vicinity. During the full band scan, the UE explores the entire frequency spectrum and examines all possible RATs supported by its hardware capabilities. This includes scanning for 2G or GSM (Global System for Mobile Communications), 3G or UMTS (Universal Mobile Telecommunications System), 4G or LTE (Long-Term Evolution), 5G or NR (New Radio), and any other relevant RATs. The purpose of a full band scan is to identify and evaluate all potential networks to which the UE can establish a connection. However, the full band scan procedure is time-consuming due to the number of supported bands and radio coverage associated with each RAT. The drawbacks and challenges associated with the stored procedure are discussed below in conjunction with FIGS. 1-4, illustrating the problems faced in the related arts.

FIG. 1 is a schematic diagram of an example scenario depicting a stored search procedure failure during a mode change, according to the related art. As shown in FIG. 1, the UE is registered on RAT1 and may experience any of the following issues. In one scenario, a user may trigger a mode change operation to change its registration from RAT1 to RAT2. In another scenario, RAT1 may be barred due to multiple-time registration procedure failure. The aforementioned situation particularly occurs in the case of LTE and NR. In yet another scenario, RAT1 may be disabled by the user. Based on a network configuration either via system information block (SIB) or measurement objects (MO) in radio resource control (RRC) messages, the UE configures IRAT measurement in idle and connected mode, respectively. However, in a case where a low signal area or high interference, the UE may not be able to measure neighbor cells of the same and other RATs and enters into OOS. As per the current design, the stored search procedure on the target RAT (in the present example, the target RAT is RAT2) can be triggered. However, there may be a case where the UE may have very old stored cell information and that may no longer be applicable for the stored search procedure. That is to say, the UE may have a very old frequency list that may not even belong to a current geographic area of the UE. In each of such cases, the stored search procedure fails, and a full band scan search procedure is triggered. Since the full band scan search procedure is time-consuming, a delay in camping on the target RAT would be observed. Additionally, UE would experience more power consumption. It is possible the end user may miss the paging for mobile terminated (MT) call due to longer time taken during the full band scan procedure. Due to prolonged usage of RF for blind scan in primary/secondary SIM can impact the secondary/primary SIM services respectively for Dual SIM Dual Standby phones.

FIGS. 2*a* and 2*b* are schematic diagrams of example scenarios depicting the stored search procedure failure during Evolved Packet Service Fallback (EPSFB) and Circuit-Switched Fallback (CSFB) respectively, according to the related art. As shown in FIG. 2*a*, the UE is connected to a network (NW) via new radio (NR) and may not support Voice Over NR (VoNR). Consequently, a service request is triggered by the UE to the NW to handle the VoNR call. In response to the triggering of the service request, the NW responds with RrcConnectionRelease with redirection information (RedirectionInfo) associated with a target RAT for the UE to camp on the target RAT and handle EPSFB. However, there can be a case where the UE does not receive the RedirectionInfo from the NW. One reason can be RACH failure during the service request message due to which the NW does not receive the service request message. Another reason can be the non-reception of the RrcConnectionRelease message at the UE due to lower layer failure in receiving/decoding of downlink (DL) packets. Another reason can be the RrcConnectionRelease message abstract syntax notation (ASN.1) decoding failure at the (RRC) module due to reception of malformed packets. Rarely, but it can happen that RrcConnectionRelease is received without redirection information. These scenarios can cause a Non-Access Stratum (NAS) module to select LTE network and initiate the stored search procedure. As discussed above, the stored search procedure fails, and a full band scan search procedure is triggered, which is time and power-consuming. Besides the likelihood of missing the MT call, the user may not be able to get any services due to the delay in mobile originated (MO) calls. Especially, when emergency services are required, any kind of delay in service acquisition or call establishment could become highly critical.

Similarly, as shown in FIG. 2*b*, the UE is connected to a network (NW) via LTE and may not support Voice Over LTE (VoLTE). Consequently, an Extended Service Request (ESR) is triggered by the UE to the NW to handle the VoLTE call. In response to the triggering of the ESR request, the NW and UE perform similar operations as explained in FIG. 2*a* to camp on the target RAT and handle circuit switched (CS) call. Accordingly, the scenario as shown in FIG. 2*b* causes the NAS module to select GSM or UMTS network and initiate the stored search procedure.

FIG. 3 is a schematic diagram of an example scenario depicting stored search procedure failure during a manual search, according to the related art. A background search procedure can be triggered in response to a user request, Home PLMN (HPLMN) search timer expiry, or higher priority RAT search. As per the current implementations, the background search procedure can be stored, or a full band scan search can be performed for a particular RAT. During the stored search, a particular stored RAT frequency list may not be updated as per the current geographical area of the UE. As a result, a user or internal NAS module may not get the expected results from the stored search procedure which may further lead to a full band scan background search procedure. Since the full band scan background search procedure is carried out during a sleep time of the active RAT, which not only has a higher impact on battery and time consumption, leading to bad user experiences.

FIG. 4 is a schematic diagram of an example scenario depicting stored search procedure failure in a multi-SIM device, according to the related art. As shown in the figure, on a failure of the stored search, the UE initiates a full band scan search procedure which requires more time for completion and puts low-priority activities of the peer stack on hold when the UE is a dual sim dual standby device.

Accordingly, it becomes necessary to provide an improved method for avoiding full scan procedure(s) in order to acquire the network services faster by improving the search mechanism in wireless communication networks.

SUMMARY

According to an aspect of the disclosure, a method for performing a cell search operation includes: determining whether a User Equipment (UE) is camped on a first Radio Access Technology (RAT) among a plurality of RATs and supports camping on a second RAT different from the first RAT; acquiring, based on determining that the UE is camped on the first RAT and supports camping on the second RAT, first information corresponding to a first Public Land Mobile Network Identity (PLMN ID) associated with the first RAT and at least one first inter-RAT (IRAT) frequency0, the at least one first IRAT frequency being associated with the first RAT; storing the first information corresponding to the first PLMN ID in a database of the UE; detecting an occurrence of one or more first events indicating that the UE is required to leave the first RAT and camp on another RAT to handle the event; based on detecting the occurrence of the one or more first events, performing the cell search operation corresponding to the first PLMN ID based on the stored first information to camp the UE on the second RAT.

The method of acquiring the first information may include: determining whether system information associated with the at least one first IRAT frequency is scheduled on the first RAT; and acquiring the first information based on determining that the UE is camped on the first RAT and the system information associated with the at least one first IRAT frequency is scheduled on the first RAT.

The first information may be acquired from at least one of system information block (SIB), career aggregation (CA), dual connectivity (DC), or measurement objects during a connected mode associated with an operational state of the UE.

The method may further include: based on detecting the occurrence of the one or more first events, triggering a first timer associated with information corresponding to one or more PLMN IDs stored in the database; and deleting the stored information corresponding to the one or more PLMN IDs from the database after expiration of the first timer.

The method may further include: based on a corresponding IRAT frequency being stored in the database, triggering a second timer for the corresponding IRAT frequency of the at least one first IRAT frequency corresponding to a PLMN ID among the one or more PLMN IDs; and deleting the stored corresponding IRAT frequency from the database after expiration of the second timer.

The method may further include: detecting an occurrence of one or more second events indicating a change in a UE location; based on detecting the occurrence of the one or more second events, acquiring second information corresponding to a second PLMN ID associated with a second RAT and at least one second IRAT frequency, the at least one second IRAT frequency being associated with the second RAT and on which camping the UE is supported; validating the second information and storing the validated second information in the database; and updating the database based on a result of the validation.

The method may further include: comparing a distance associated with the at least one first IRAT frequency with a predefined distance threshold value; and validating an entry of one or more IRAT frequencies in the database based on a result of the comparison.

The method may further include: acquiring and storing at least one of a neighbour frequency or cell information associated with the first PLMN ID corresponding to the first RAT in the database.

According to an aspect of the disclosure, a user equipment (UE) system includes: a memory storing at least one instruction; and at least one processor operatively coupled to the memory, and configured to execute the at least one instruction to: determine whether the UE is camped on a first Radio Access Technology (RAT) among a plurality of RATs and supports camping on a second RAT different from the first RAT, acquire, based on determining that the UE is camped on the first RAT and supports camping on the second RAT, first information corresponding to a first Public Land Mobile Network Identity (PLMN ID) associated with the first RAT at least one first inter-RAT (IRAT) frequency, the at least one first IRAT frequency being associated with the first RAT, store the first information corresponding to the first PLMN ID in a database of the UE, detect an occurrence of one or more first events indicating that the UE is required to leave the first RAT and camp on another RAT to handle the event, and based on detecting the occurrence of the one or more first events, perform a cell search operation corresponding to the first PLMN ID based on the stored first information to camp the UE on the second RAT.

The at least one processor may be further configured to execute the at least one instruction to: determine whether system information associated with the at least one first IRAT frequency is scheduled on the first RAT; and acquire the first information based on determining that the UE is camped on the first RAT and the system information associated with the at least one first IRAT frequency is scheduled on the first RAT.

The first information may be acquired from at least one of system information block (SIB), career aggregation (CA), dual connectivity (DC), or measurement objects during a connected mode associated with an operational state of the UE.

The at least one processor may be further configured to execute the at least one instruction to: based on detecting the occurrence of the one or more first events, trigger a first timer associated with information corresponding to one or more PLMN IDs stored in the database; and delete the stored information corresponding to the one or more PLMN IDs from the database after expiration of the first timer.

The at least one processor may be further configured to execute the at least one instruction to: based on a corresponding IRAT frequency being stored in the database, trigger a second timer for the corresponding IRAT frequency of the at least one first IRAT frequency corresponding to a PLMN ID among the one or more PLMN IDs; and delete the stored corresponding IRAT frequency from the database after expiration of the second timer.

The at least one processor may be further configured to execute the at least one instruction to: detect an occurrence of one or more second events indicating a change in a UE location; based on detecting the occurrence of the one or more second events, acquire second information corresponding to a second PLMN ID associated with a second RAT and at least one second IRAT frequency, the at least one second IRAT frequency being associated with the second RAT and on which camping the UE is supported; validate the second information and store the validated second information in the database; and update the database based on a result of the validation.

The at least one processor may be further configured to execute the at least one instruction to: compare a distance associated with the at least one first IRAT frequency with a predefined distance threshold value; and validate an entry of one or more IRAT frequencies in the database based on a result of the comparison.

The at least one processor may be further configured to execute the at least one instruction to: acquire and store at least one of a neighbour frequency or cell information associated with the first PLMN ID corresponding to the first RAT in the database.

According to an aspect of the disclosure, a non-transitory computer readable medium stores computer readable program code or instructions which are executable by a processor to perform a method for performing a cell search operation. The method includes: determining whether a User Equipment (UE) is camped on a first Radio Access Technology (RAT) among a plurality of RATs and supports camping on a second RAT different from the first RAT; acquiring, based on determining that the UE is camped on the first RAT and supports camping on the second RAT, first information corresponding to a first Public Land Mobile Network Identity (PLMN ID) associated with the first RAT and at least one first inter-RAT (IRAT) frequency0, the at least one first IRAT frequency being associated with the first RAT; storing the first information corresponding to the first PLMN ID in a database of the UE; detecting an occurrence of one or more first events indicating that the UE is required to leave the first RAT and camp on another RAT to handle the event; based on detecting the occurrence of the one or more first events, performing the cell search operation corresponding to the first PLMN ID based on the stored first information to camp the UE on the second RAT.

The method may further comprise: determining whether system information associated with the at least one first IRAT frequency is scheduled on the first RAT; and acquiring the first information based on determining that the UE is camped on the first RAT and the system information associated with the at least one first IRAT frequency is scheduled on the first RAT.

The method may further comprise: detecting an occurrence of one or more second events indicating a change in a UE location; based on detecting the occurrence of the one or more second events, acquiring second information corresponding to a second PLMN ID associated with a second RAT and at least one second IRAT frequency, the at least one second IRAT frequency being associated with the second RAT and on which camping the UE is supported; validating the second information and storing the validated second information in the database; and updating the database based on a result of the validation.

The method may further comprise: comparing a distance associated with the at least one first IRAT frequency with a predefined distance threshold value; and validating an entry of one or more IRAT frequencies in the database based on a result of the comparison.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 7 is a line diagram depicting an example procedure for storing and retrieval of IRAT frequencies to/from the RRC-CDB, according to an embodiment;

DETAILED DESCRIPTION

Figure 1:
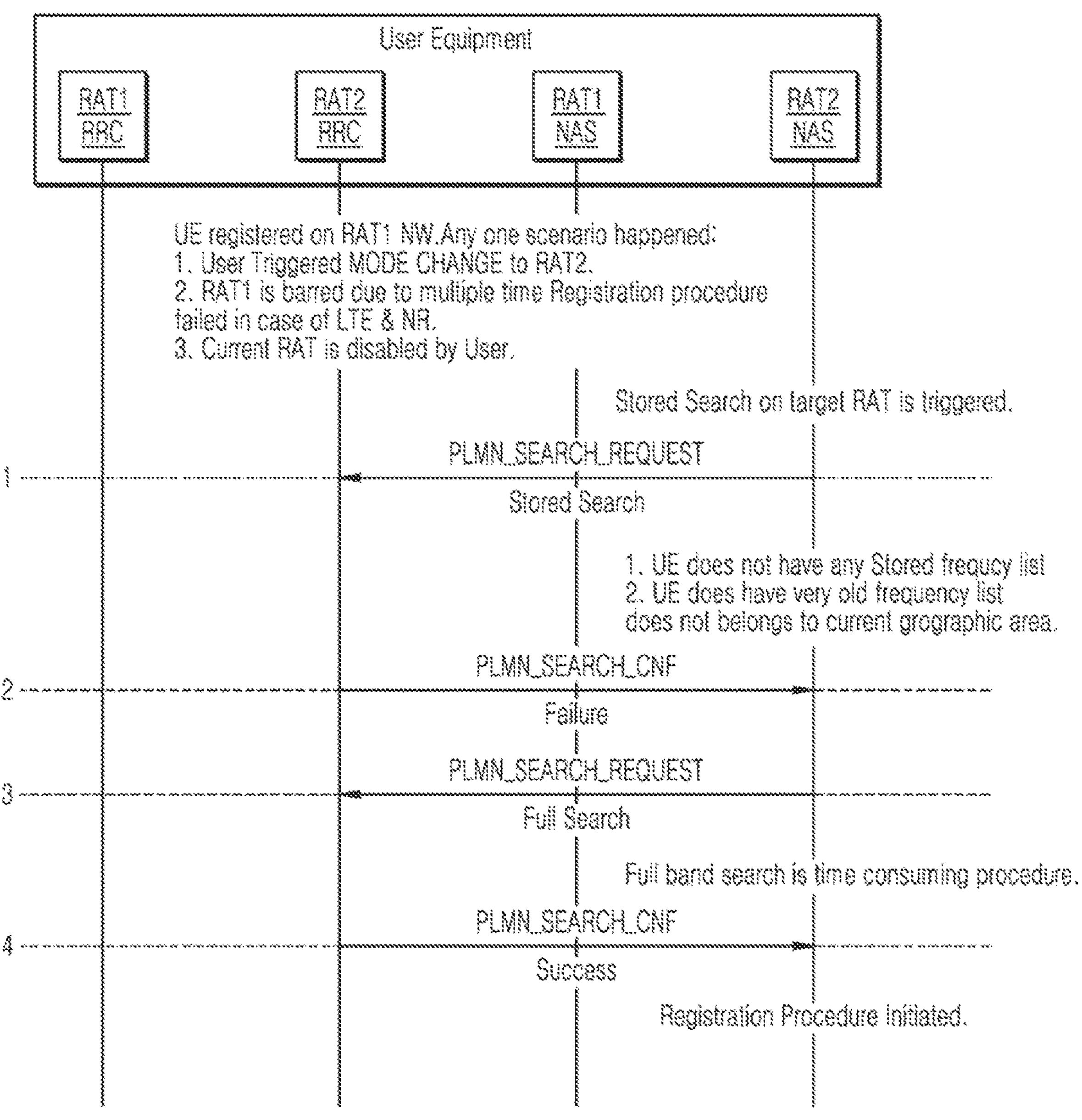
FIG. 1 is a schematic diagram of an example scenario depicting a stored search procedure failure during a mode change, according to related art.
Figure 2A:
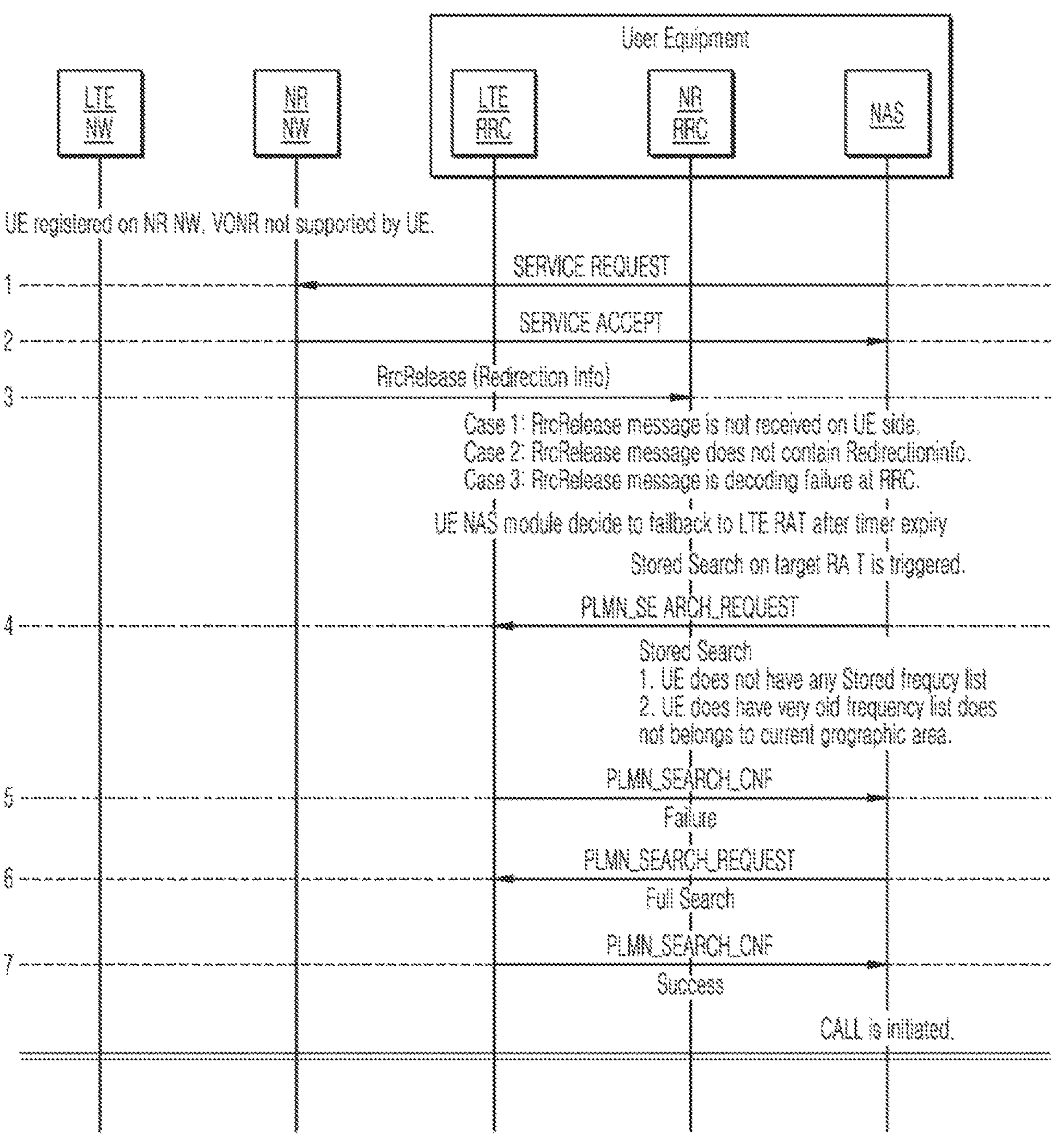
FIGS. 2*a* and 2*b* are schematic diagrams of example scenarios depicting the stored search procedure failure during evolved packet service fallback (EPSFB) and circuit-switched fallback (CSFB) respectively, according to related art.
Figure 2B:
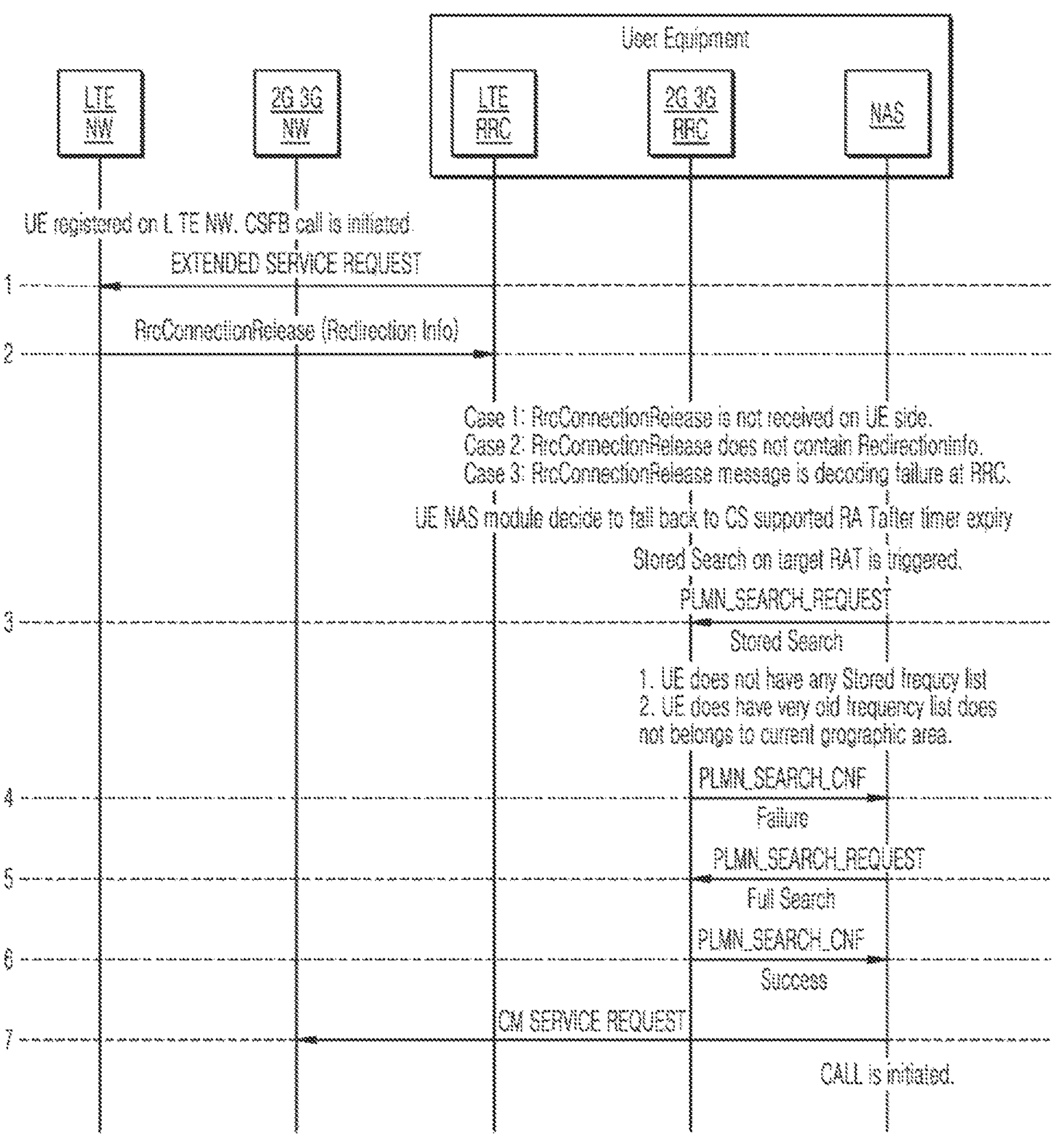
Figure 3:
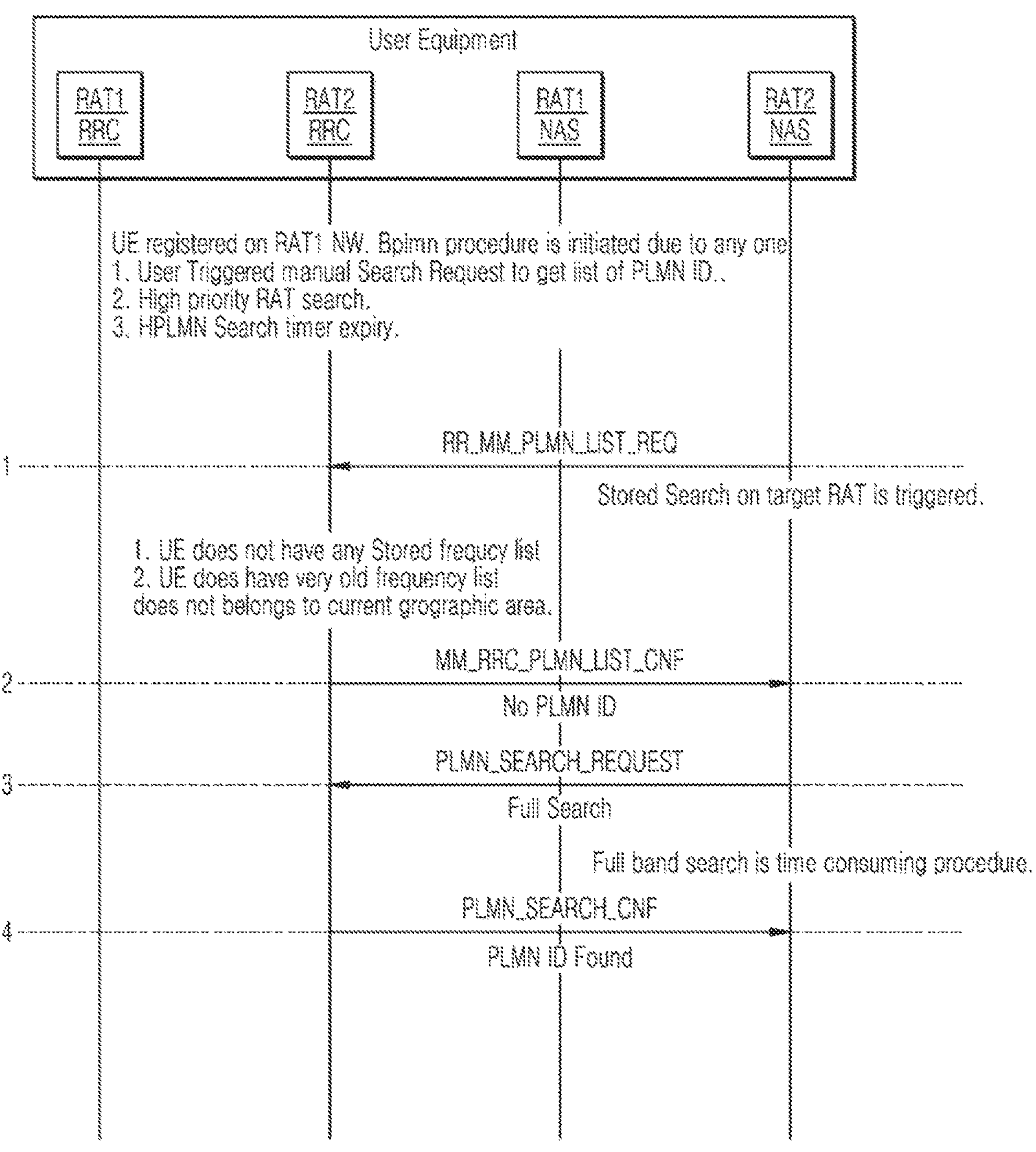
FIG. 3 is a schematic diagram of an example scenario depicting stored search procedure failure during a manual search, according to an related art.
Figure 4:
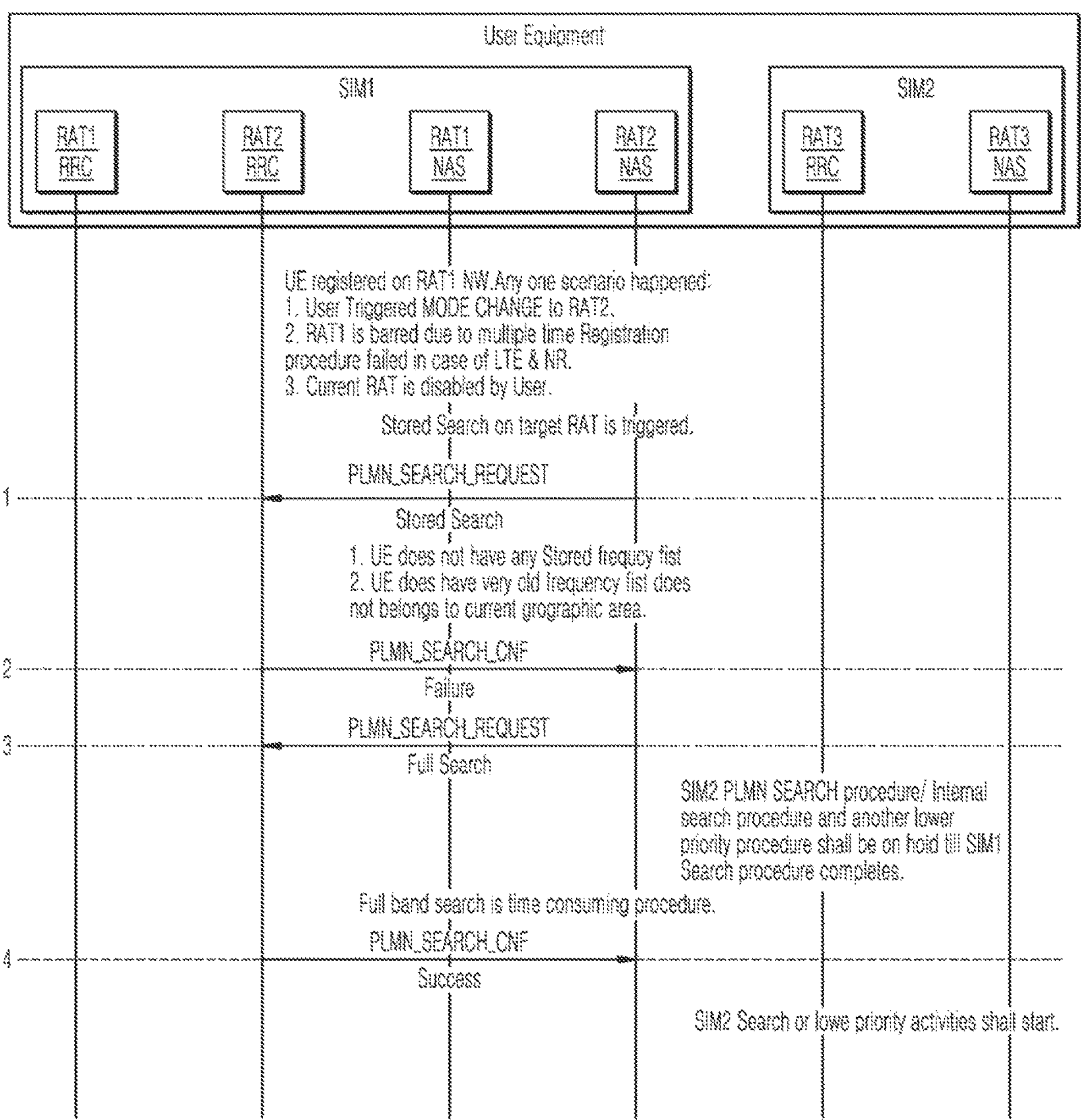
FIG. 4 is a schematic diagram of an example scenario depicting stored search procedure failure in a multi-SIM device, according to an related art.

For the purpose of promoting an understanding of the principles of the invention, reference will now be made to the various embodiments and specific language will be used to describe the same. It should be understood at the outset that although illustrative implementations of the embodiments of the present disclosure are illustrated below, the present invention may be implemented using any number of techniques, whether currently known or in existence. The present disclosure is not necessarily limited to the illustrative implementations, drawings, and techniques illustrated below, including the example design and implementation illustrated and described herein, but may be modified within the scope of the present disclosure.

It will be understood by those skilled in the art that the foregoing general description and the following detailed description are explanatory of the invention and are not intended to be restrictive thereof.

Reference throughout this specification to “an aspect”, “another aspect” or similar language means that a particular feature, structure, or characteristic described in connection with the embodiment is included in at least one embodiment of the present invention. Thus, appearances of the phrase “in an embodiment”, “in another embodiment” and similar language throughout this specification may, but do not necessarily, all refer to the same embodiment.

It is to be understood that as used herein, terms such as, “includes,” “comprises,” “has,” etc. are intended to mean that the one or more features or elements listed are within the element being defined, but the element is not necessarily limited to the listed features and elements, and that additional features and elements may be within the meaning of the element being defined. In contrast, terms such as, “consisting of” are intended to exclude features and elements that have not been listed.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. Also, the various embodiments described herein are not necessarily mutually exclusive, as some embodiments can be combined with one or more other embodiments to form new embodiments. The term “or” as used herein, refers to a non-exclusive or unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks that carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having the benefit of the description herein.

Described herein is a method, implemented in a user equipment (UE) for storing inter-RAT (IRAT) frequencies and performing a cell search operation using the stored IRAT frequencies.

An object of the present disclosure is to provide techniques for avoiding full band search, and therefore, preventing the battery consumption of the UE. Thus, an object of the present disclosure is to improve the overall user experience associated with wireless communication while using the UE by improving the success rate of the stored search procedures.

The present disclosure achieves the above-described objectives by providing a technique to store information associated with IRAT frequencies in a common database. The information stored in the common database may be utilized for RRC redirection, and therefore, the common database is termed interchangeably as RRC common database (RRC-CDB), throughout the present description.

Referring now to the drawings, and more particularly to FIGS. 5-9*c*, where similar reference characters denote corresponding features consistently throughout the figures, there are shown preferred embodiments.

Figure 5:
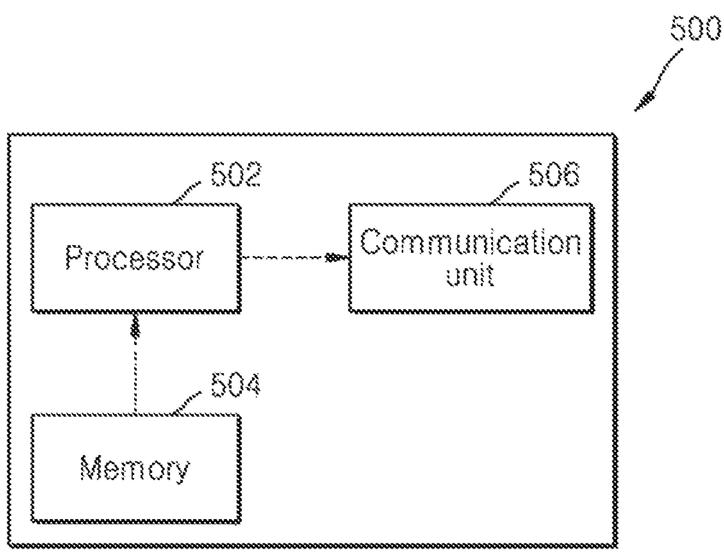
FIG. 5 is a block diagram of a UE for storing inter-RAT (IRAT) frequencies and performing a cell search operation using the stored IRAT frequencies, according to an embodiment.

FIG. 5 is a block diagram of a UE for storing inter-RAT (IRAT) frequencies and performing a cell search operation using the stored IRAT frequencies, according to an embodiment of the present disclosure. The user equipment (UE) 500 may include at least one processor 502, a memory 504 (e.g., storage), and a communication unit 506 (e.g., communicator or communication interface). The communication unit 506 may perform one or more functions for transmitting and receiving signals via a wireless channel.

As an example, processor 502 may be a single processing unit or a number of units, all of which could include multiple computing units. The processor 502 may be implemented as one or more microprocessors, microcomputers, microcontrollers, digital signal processors, central processing units, state machines, logic circuitries, and/or any devices that manipulate signals based on operational instructions. Among other capabilities, the processor 502 fetches and executes computer-readable instructions and data stored in the memory. The processor 502 may include one or a plurality of processors. At this time, one or a plurality of processors 502 may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors 502 may control the processing of the input data in accordance with a predefined operating rule or artificial intelligence (AI) model stored in the non-volatile memory and the volatile memory, i.e., memory 504. The predefined operating rule or artificial intelligence model is provided through training or learning.

The memory 504 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes. Additionally, the memory 504 may include the RRC-CDB.

Figure 6A:
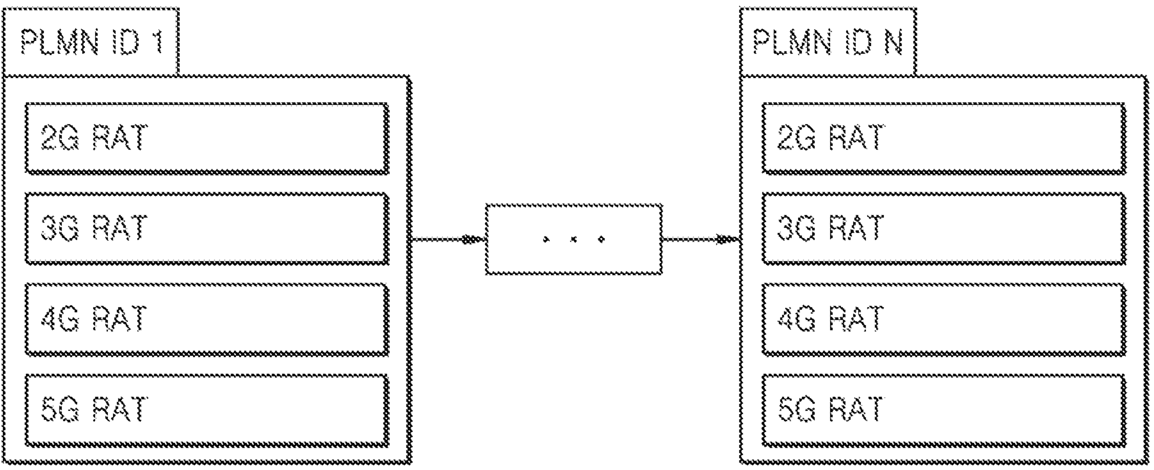
FIGS. 6*a* and 6*b* are block diagrams depicting an example representation of information stored in an RRC-CDB, according to an embodiment.
Figure 6B:
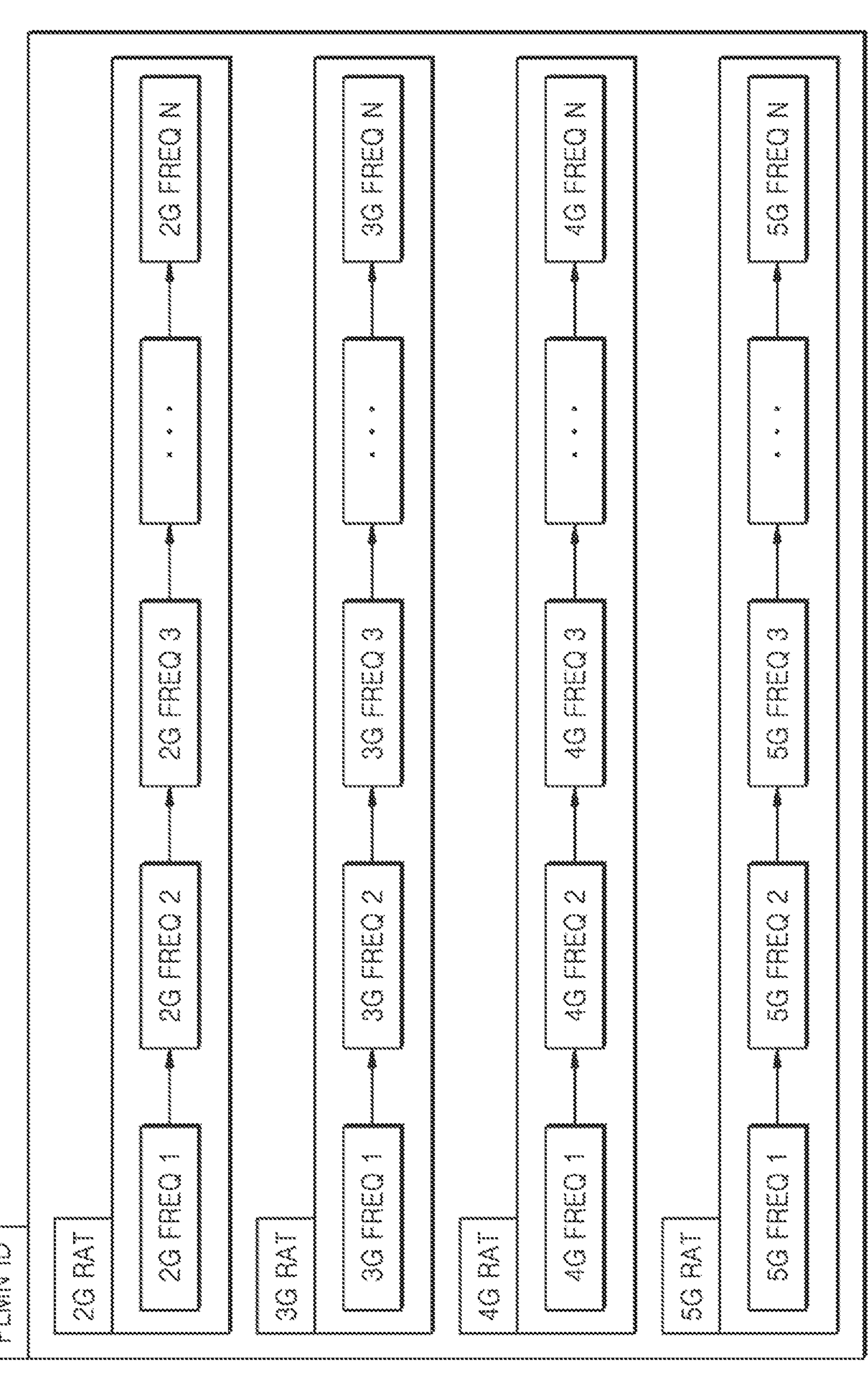

FIGS. 6*a* and 6*b* are block diagrams depicting an example representation of information stored in an RRC-CDB, according to an embodiment of the present disclosure. RRC-CDB may contain information with respect to Public Land Mobile Network Identity (PLMN ID) separately. In telecommunication, PLMN is a combination of several cellular technologies such as but not limited to GSM/2G, UMTS/3G, LTE/4G, and NR/5G offered by a single operator within a given country. A PLMN is identified by a unique PLMN ID, which consists of a mobile country code (MCC) and a mobile network code (MNC). According to the embodiments of the present disclosure, the RRC-CDB may store information associated with RATs supported by a network operator corresponding to the PLMN ID. For example, as shown in FIG. 6*a*, information associated with RATs supported by PLMN ID1 is stored separately from the information associated with RATs supported by PLMN ID2. In an embodiment, the RRC-CDB may store inter-RAT (IRAT) frequencies associated with each PLMN ID, as depicted in FIG. 6*b*. To improve the success rate of stored searches, information associated with the IRAT frequencies is stored in the RRC-CDB. The common database or RRC-CDB may be updated for each RAT and the stored information from the RRC-CDB may be used during stored cell search across RATs as well as across subscriber identity modules (SIMs) in multiple universal subscriber identity modules (MUSIM) devices. Each RAT information shall be mapped with the PLMN ID so that frequencies of only target PLMN can be considered. The mapping may also be useful across SIMs if the same operator-based SIM card is used in a multi-SIM scenario. The process of storing and retrieving IRAT frequencies is discussed below in forthcoming paragraphs in conjunction with FIG. 7.

Figure 7:
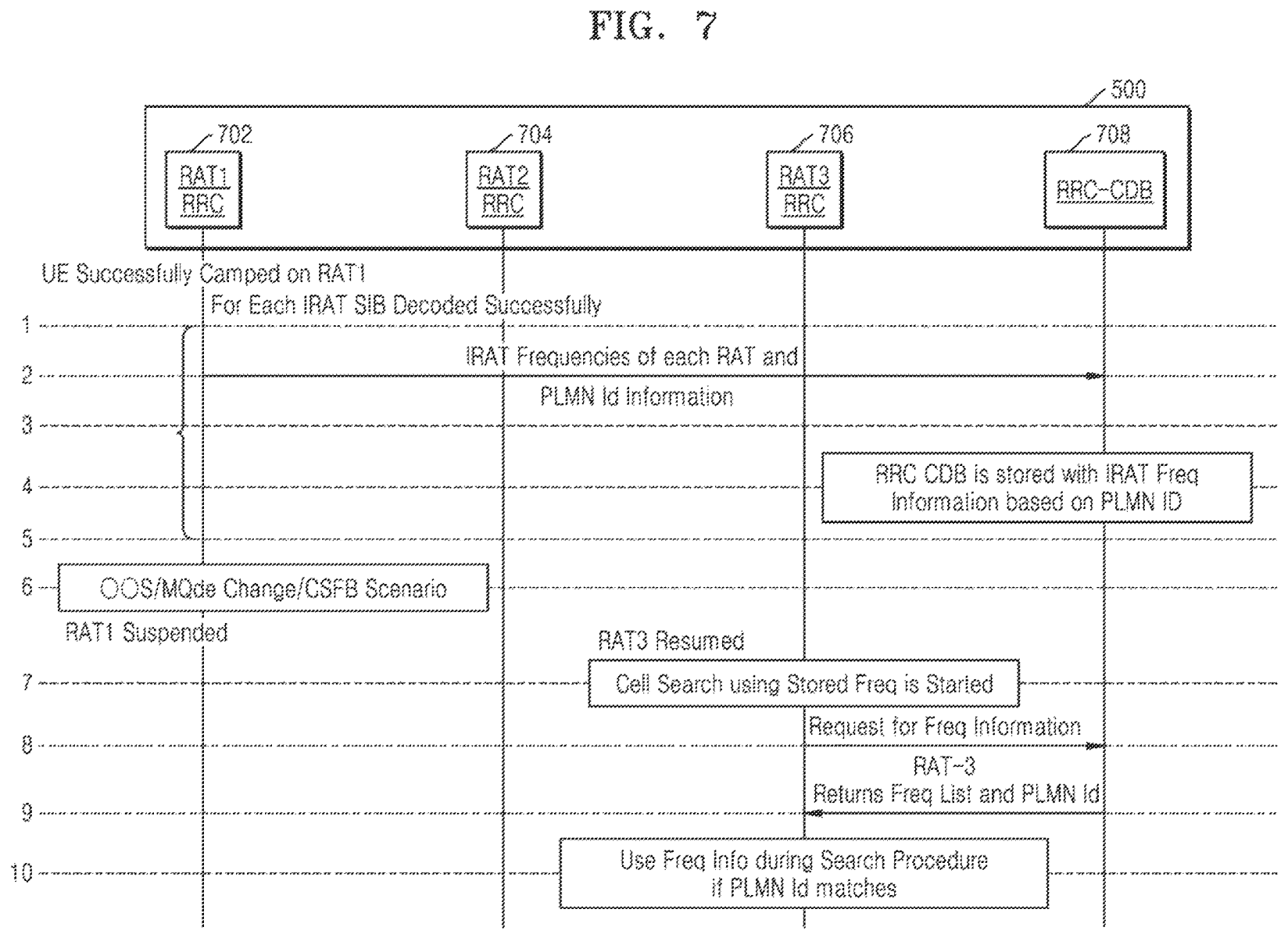

FIG. 7 is a line diagram depicting an example procedure for storing and retrieval of IRAT frequencies to/from the RRC-CDB 708, according to an embodiment of the present disclosure. A UE 500 may be successfully camped on a RAT during the normal service of a network operator. In an embodiment, upon successful camping, information associated with IRAT frequencies may be fetched from system information blocks (SIBs). Thereafter, the RRC-CDB may be updated with the fetched IRAT frequencies along with their PLMN ID. IRAT frequencies are stored corresponding to their PLMN IDs such that when the RRC-CDB is used across SIMs in multi-SIM cases, the target RAT can get only the relevant details if the same or equivalent operator is used. In an embodiment, in an emergency camping scenario, with the common RRC-CDB, IRAT frequencies may be used irrespective of the associated PLMN ID. In such an emergency scenario, if a stored search procedure is triggered in any RAT as a result of one of the RAT mode changes, out-of-service (OOS) Recovery, or circuit switched fallback (CSFB), evolved packet service fallback (EPSFB) or, the like, the target RAT may check the RRC-CDB and retrieve its frequency details if available. In an embodiment of the present disclosure, the information corresponding to IRAT frequencies may be fetched from other sources such as but not limited to measurement objects configured by a network, carrier aggregation frequencies, and dual connectivity.

In an example scenario as depicted in FIG. 7, the UE 500 may be successfully camped on RAT1 702 that may be supported by a network operator having a PLMN ID. In an embodiment, the network operator may support RAT2 704 and RAT3 706 besides RAT1 702. According to the embodiments of the present disclosure, IRAT frequencies associated with each RAT, i.e., RAT1 702 as well as RAT2 704 and RAT3 706 corresponding to the PLMN ID may be obtained from a SIB received during communication via RAT1 702. In an alternate embodiment of the present disclosure, the IRAT frequencies may be obtained from measurement configuration (measurement objects) in connected mode, Secondary cell (SCell) configured during carrier aggregation, a Primary Secondary cell (PScell) in secondary cell group (SCG) as well based on SIB1 received in the Master Information Block (MIB). In yet another embodiment of the present disclosure, the IRAT frequencies may also be received from any other source that helps with the mobility of the UE 500 in connected or idle mode. In yet another embodiment of the present disclosure, one or more neighbor frequency or cell information of the same RAT (for example, RAT1 702 in the present example scenario) may be stored. Such information may be useful in multi-SIM phones where peer stack attempts to camp on same RAT. The RRC-CDB 708 can be enhanced further by considering secondary cell frequencies in the Secondary Cell Group (SCG) and other mobility enhancement related information. These enhancements can further improve the success ratio of stored search.

In the example scenario depicted in FIG. 7, RAT1 702 may be suspended due to any of the reasons discussed above, and the UE may be required to camp on RAT3 706. Here RAT3 706 may be considered the target RAT. The UE may be informed to camp on a RAT other than RAT1 702 based on a PLMN module policy of a NAS entity. For example, the UE may be informed for camping on RAT3 706. To camp on RAT3 706, a stored search may be triggered. Firstly, IRAT frequencies corresponding to the target RAT (for example RAT3 706), along with the PLMN ID may be obtained from the RRC-CDB 708. During the stored search, if the obtained PLMN ID matched with the PLMN ID of RAT1, a cell search operation may be performed based on the obtained IRAT frequencies corresponding to RAT3 706. Therefore, a full band search is successfully avoided. However, one major limitation of the stored search mechanism is that the data may become obsolete or invalid after some time. In an embodiment, to avoid using obsolete data, the RRC-CDB 708 may be reset or modified once the information associated with IRAT frequencies stored in the RRC-CDB 708 is determined to be invalid. In an example, the RRC-CDB 708 may be updated with valid IRAT frequencies. Further, an example scenario for resetting the RRC-CDB 708 is described below in conjunction with FIG. 8.

Figure 8:
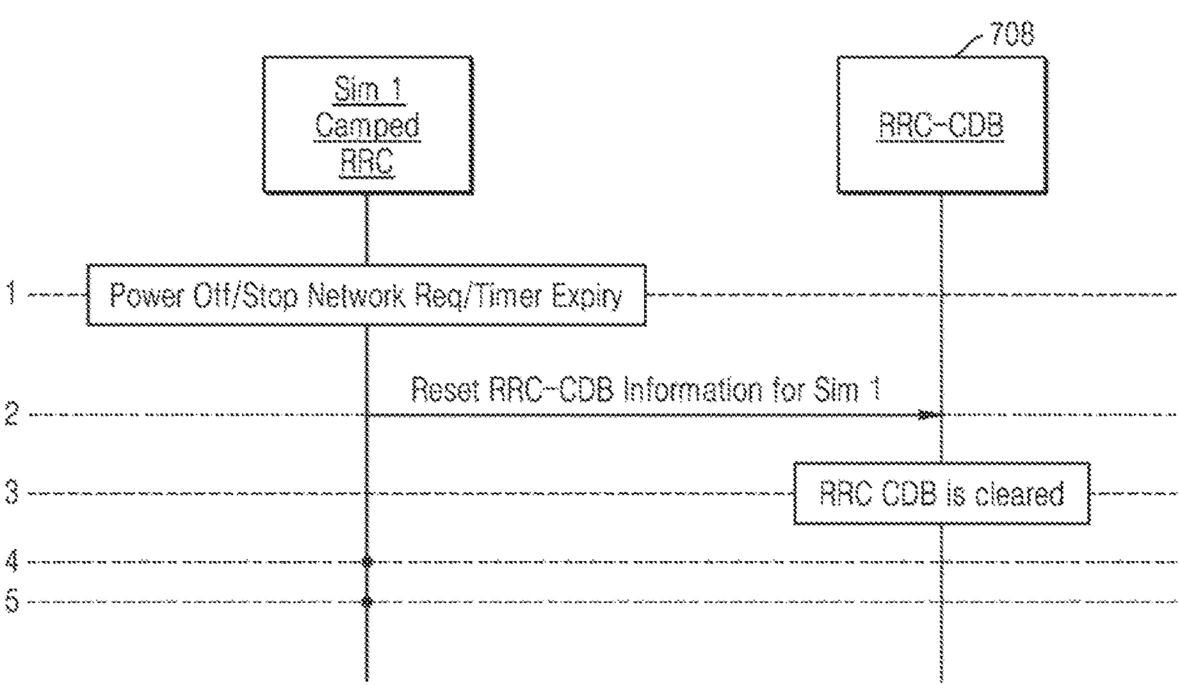
FIG. 8 is a line diagram depicting an example scenario of resetting the RRC-CDB, according to an embodiment.

FIG. 8 is a line diagram depicting an example scenario of resetting the RRC-CDB 708, according to an embodiment of the present disclosure. Several criteria may be considered based on which the stored information associated with IRAT frequencies is determined as invalid. In an embodiment, a timer associated with the validity of the stored information IRAT frequencies in RRC-CDB 708 may be maintained. Maintaining such a validity timer may be useful since multiple searches are triggered when a UE continuously tries to camp on a cell during normal service. The validity timer may be triggered upon RAT suspension or OOS. Upon the expiry of the validity timer, the RRC-CDB 708 may be reset by clearing the stored information associated with IRAT frequencies.

In an embodiment, a separate timer may be maintained for each IRAT frequency. The separate timer may be associated with each IRAT frequency when the information associated with the IRAT frequency is added or updated in the RRC-CDB 708. The stored IRAT frequency may be removed from the RRC-CDB 708 upon the expiry of the associated separate timer.

In an embodiment, wide location-based parameters like mobile country code (MCC), if available, may be used to update the validity of an entry in the RRC-CDB 708. If UE camps on a cell belonging to a different MCC, IRAT frequencies associated with previous MCC may not be considered. In such cases, the information associated with stored IRAT frequencies may be updated with the IRAT frequencies associated with the different MCC.

In an embodiment, a distance of an IRAT frequency when measured may be stored in the RRC-CDB 708. A distance based threshold may be used to consider a stored IRAT frequency as invalid. In the example scenario depicted in FIG. 8, the stored IRAT frequencies in the RRC-CDB 708 may be removed when the UE is switched off, or switched to flight mode on, or a timer expires.

At least by virtue of aforesaid, the present subject matter at least provides the following advantages:

The method described in the embodiments herein reduces the time taken for average camping across multiple RATs in various scenarios. Further, the chances of MT page miss, and delay(s) in initiating any MO procedure are reduced. Furthermore, the possibilities of successful EPSFB and CSFB are also improved. In multi-SIM cases, due to improved stored search techniques, embodiments described herein ensure that the peer stack lower priority procedure is not blocked for a long time. Moreover, the method described in the embodiments herein enables a reduction in battery consumption, thereby improving the user experience. Furthermore, since the RRC-CDB 708 contains information fetched from the network based on its neighboring RAT information, it is more reliable in both static and moving conditions than the information stored based on the same RAT long before when it camped on the cell. The method for storing IRAT frequencies and performing a cell search operation using the stored IRAT frequencies is discussed in conjunction with FIGS. 9*a*, 9*b*, and 9*c*.

Figure 9A:
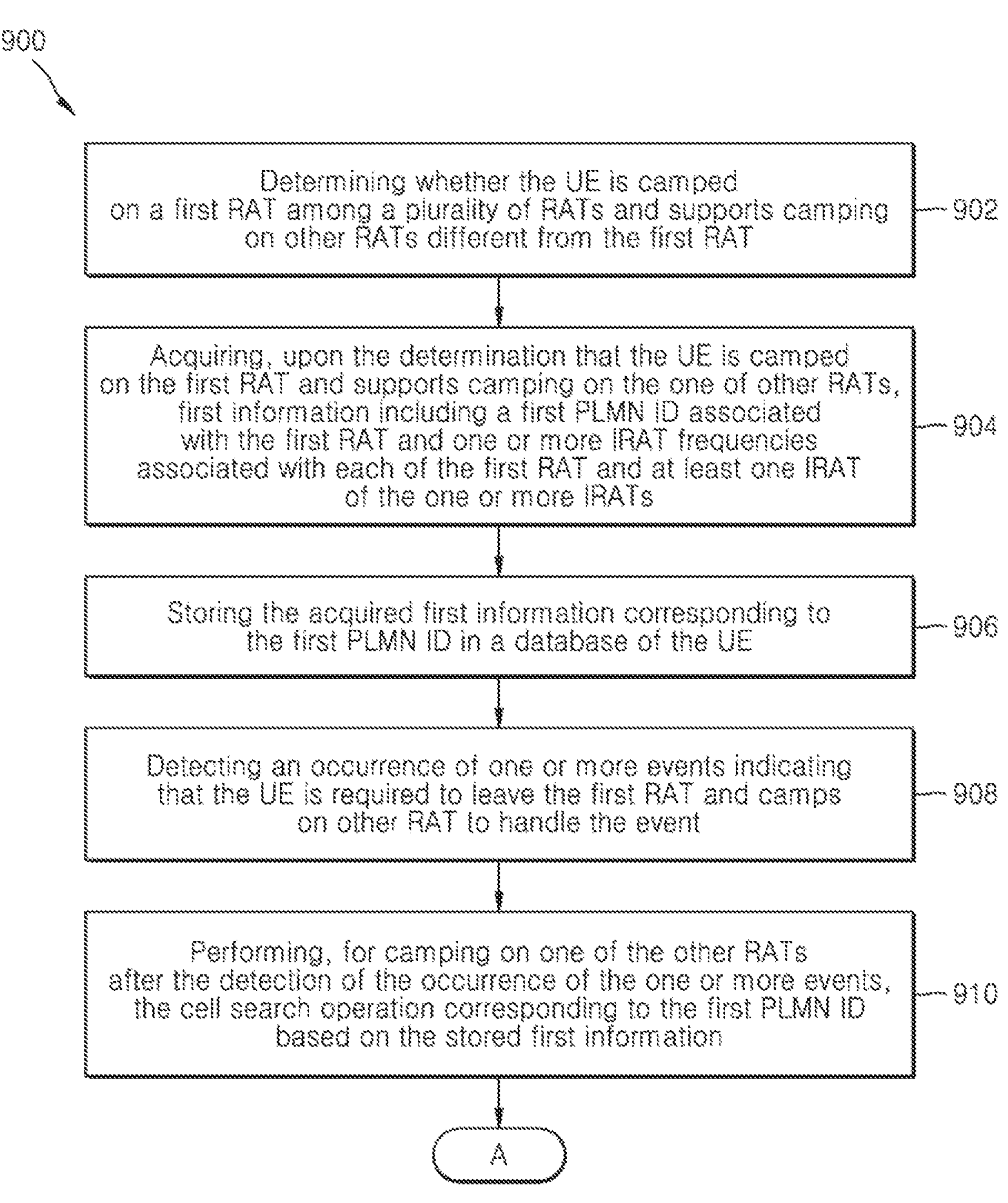
FIGS. 9*a*, 9*b*, and 9*c* are flow diagrams depicting a method for storing IRAT frequencies and performing a cell search operation using the stored IRAT frequencies, according to one or more embodiments.
Figure 9B:
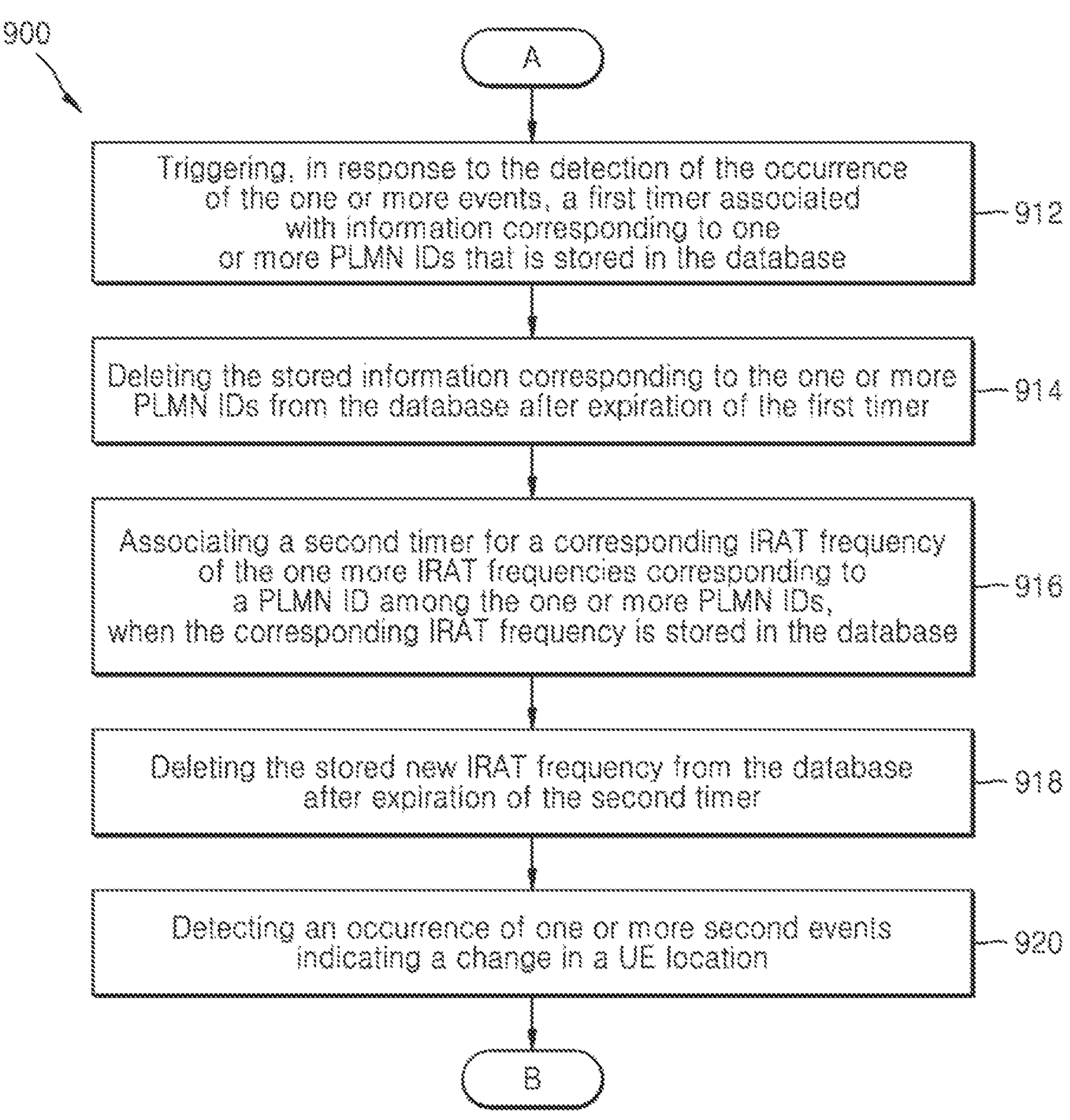
Figure 9C:
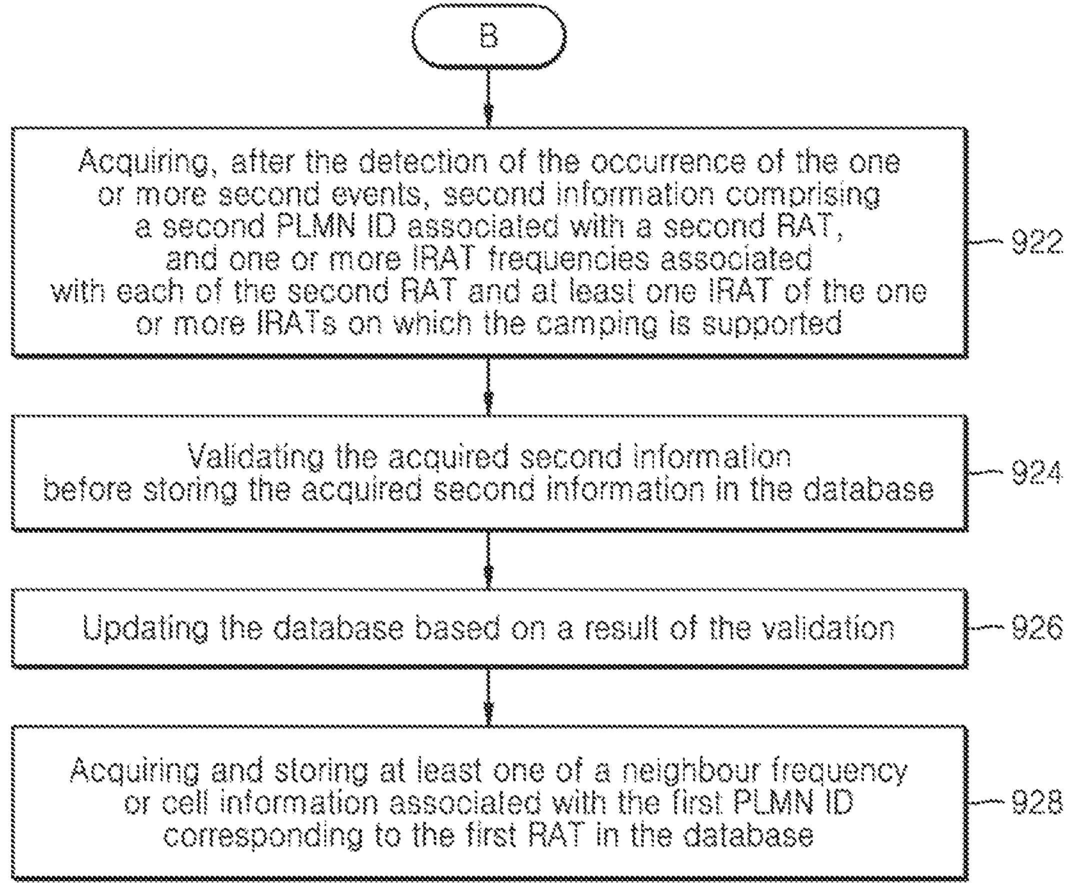

FIGS. 9*a*, 9*b*, and 9*c* are flow diagrams depicting a method 900 for storing IRAT frequencies and performing a cell search operation using the stored IRAT frequencies, according to one or more embodiments of the present disclosure. At operation 902, the method 900 includes determining whether the UE is camped on a first RAT among a plurality of RATs and supports camping on other RATs different from the first RAT. Upon the determination that the UE is camped on the first RAT and supports camping on the one of other RATs, the method 900, at operation 904, includes acquiring first information including a first PLMN ID associated with the first RAT and one or more IRAT frequencies associated with each of the first RAT and at least one IRAT of the one or more IRATs. In an embodiment, for acquiring the first information, the method includes determining whether system information associated with the one or more IRATs is scheduled on the first RAT and acquiring the first information based on the determination that the UE is camped on the first RAT and the system information associated with the one or more IRATs is scheduled on the first RAT. The system information may correspond to the system information as broadcasted by the network to which the UE is connected. In an embodiment, the first information may be acquired from at least one of system information block (SIB), career aggregation (CA), dual connectivity (DC), or measurement objects during a connected mode associated with an operational state of the UE.

Thereafter, at operation 906, the method 900 includes storing the acquired first information corresponding to the first PLMN ID in a database of the UE. Thereafter, at operation 908, the method 900 includes detecting an occurrence of one or more events indicating that the UE is required to leave the first RAT and camps on other RAT to handle the event. Thereafter, at operation 910, the method 900 includes determining whether the UE is camped on a first RAT among a plurality of RATs and supports camping on other RATs different from the first RAT.

Thereafter, at operation 912, the method 900 includes triggering, in response to the detection of the occurrence of the one or more events, a first timer associated with information corresponding to one or more PLMN IDs that is stored in the database. Thereafter, at operation 914, the method 900 includes deleting the stored information corresponding to the one or more PLMN IDs from the database after the expiration of the first timer. Thereafter, at operation 916, the method 900 includes triggering a second timer for a corresponding IRAT frequency of the one or more IRAT frequencies corresponding to a PLMN ID among the one or more PLMN IDs, when the corresponding IRAT frequency is stored in the database. Thereafter, at operation 918, the method 900 includes deleting the stored new IRAT frequency from the database after expiration of the second timer. Thereafter, at operation 920, the method 900 includes detecting an occurrence of one or more second events indicating a change in a UE location. After the detection of the occurrence of the one or more second events, the method 900, at operation 922, includes acquiring second information comprising a second PLMN ID associated with a second RAT, and one or more IRAT frequencies associated with each of the second RAT and at least one IRAT of the one or more IRATs on which the camping is supported. Thereafter, at operation 924, the method 900 includes validating the acquired second information before storing the acquired second information in the database. Thereafter, at operation 926, the method 900 includes updating the database based on a result of the validation. Thereafter, at operation 928, the method 900 includes acquiring and storing at least one of a neighbor frequency or cell information associated with the first PLMN ID corresponding to the first RAT in the database.

In an embodiment of the present disclosure, in a case where a distance associated with one or more IRAT frequencies is stored, the method includes comparing the distance associated with the one or more IRAT frequencies is greater than or less than a predefined distance threshold value and validating an entry of the one or more IRAT frequencies in the database based on a result of the comparison.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A method for performing a cell search operation, comprising:

determining whether a User Equipment (UE) is camped on a first Radio Access Technology (RAT) among a plurality of RATs and supports camping on a second RAT different from the first RAT;

acquiring, based on determining that the UE is camped on the first RAT and supports camping on the second RAT, first information corresponding to a first Public Land Mobile Network Identity (PLMN ID) associated with the first RAT and at least one first inter-RAT (IRAT) frequency, the at least one first IRAT frequency being associated with the first RAT;

storing the first information corresponding to the first PLMN ID in a database of the UE;

detecting an occurrence of one or more first events indicating that the UE is required to leave the first RAT and camp on another RAT;

based on detecting the occurrence of the one or more first events, triggering a first timer associated with a first frequency of the at least one first IRAT frequency, and performing the cell search operation corresponding to the first PLMN ID based on the stored first information to camp the UE on the second RAT;

deleting the first frequency from the database after expiration of the first timer; and based on a corresponding IRAT frequency being stored in the database, triggering a second timer for the corresponding IRAT frequency of the at least one first IRAT frequency corresponding to a PLMN ID among the one or more PLMN IDs.

2. The method of claim 1, wherein the acquiring the first information comprises:

determining whether system information associated with the at least one first IRAT frequency is scheduled on the first RAT; and acquiring the first information based on determining that the UE is camped on the first RAT and the system information associated with the at least one first IRAT frequency is scheduled on the first RAT.

3. The method of claim 1, wherein the first information is acquired from at least one of system information block (SIB), career aggregation (CA), dual connectivity (DC), or measurement objects during a connected mode associated with an operational state of the UE.

4. The method of claim 1, further comprising:

deleting the stored corresponding IRAT frequency from the database after expiration of the second timer.

5. The method of claim 1, further comprising:

detecting an occurrence of one or more second events indicating a change in a UE location;

based on detecting the occurrence of the one or more second events, acquiring second information corresponding to a second PLMN ID associated with the second RAT and at least one second IRAT frequency, the at least one second IRAT frequency being associated with the second RAT and on which camping the UE is supported;

validating the second information and storing the validated second information in the database; and updating the database based on a result of the validation.

6. The method of claim 1, further comprising:

comparing a distance associated with the at least one first IRAT frequency with a predefined distance threshold value; and validating an entry of one or more IRAT frequencies in the database based on a result of the comparison.

7. The method of claim 1, further comprising:

acquiring and storing at least one of a neighbour frequency or cell information associated with the first PLMN ID corresponding to the first RAT in the database.

8. A user equipment (UE) system, comprising:

a memory storing at least one instruction; and at least one processor operatively coupled to the memory, configured to execute the at least one instruction to:

determine whether the UE is camped on a first Radio Access Technology (RAT) among a plurality of RATs and supports camping on a second RAT different from the first RAT, based on determining that the UE is camped on the first RAT and supports camping on the second RAT, acquire first information corresponding to a first Public Land Mobile Network Identity (PLMN ID) associated with the first RAT at least one first inter-RAT (IRAT) frequency, the at least one first IRAT frequency being associated with the first RAT, store the first information corresponding to the first PLMN ID in a database of the UE, detect an occurrence of one or more first events indicating that the UE is required to leave the first RAT and camp on another RAT, based on detecting the occurrence of the one or more first events, trigger a first timer associated with a first frequency of the at least one first IRAT frequency, and perform a cell search operation corresponding to the first PLMN ID based on the stored first information to camp the UE on the second RAT, delete the first frequency from the database after expiration of the first timer, and based on a corresponding IRAT frequency being stored in the database, trigger a second timer for the corresponding IRAT frequency of the at least one first IRAT frequency corresponding to a PLMN ID among the one or more PLMN IDs.

9. The system of claim 8, wherein the at least one processor is further configured to execute the at least one instruction to:

determine whether system information associated with the at least one first IRAT frequency is scheduled on the first RAT; and acquire the first information based on determining that the UE is camped on the first RAT and the system information associated with the at least one first IRAT frequency is scheduled on the first RAT.

10. The system of claim 8, wherein the first information is acquired from at least one of system information block (SIB), career aggregation (CA), dual connectivity (DC), or measurement objects during a connected mode associated with an operational state of the UE.

11. The system of claim 8, wherein the at least one processor is further configured to execute the at least one instruction to:

delete the stored corresponding IRAT frequency from the database after expiration of the second timer.

12. The system of claim 8, wherein the at least one processor is further configured to execute the at least one instruction to:

detect an occurrence of one or more second events indicating a change in a UE location;

based on detecting the occurrence of the one or more second events, acquire second information corresponding to a second PLMN ID associated with the second RAT and at least one second IRAT frequency, the at least one second IRAT frequency being associated with the second RAT and on which camping the UE is supported;

validate the second information and store the validated second information in the database; and update the database based on a result of the validation.

13. The system of claim 8, wherein the at least one processor is further configured to execute the at least one instruction to:

compare a distance associated with the at least one first IRAT frequency with a predefined distance threshold value; and validate an entry of one or more IRAT frequencies in the database based on a result of the comparison.

14. The system of claim 8, wherein the at least one processor is further configured to execute the at least one instruction to:

acquire and store at least one of a neighbour frequency or cell information associated with the first PLMN ID corresponding to the first RAT in the database.

15. A non-transitory computer readable medium for storing computer readable program code or instructions which are executable by a processor to perform a method for performing a cell search operation, the method comprising:

determining whether a User Equipment (UE) is camped on a first Radio Access Technology (RAT) among a plurality of RATs and supports camping on a second RAT different from the first RAT;

acquiring, based on determining that the UE is camped on the first RAT and supports camping on the second RAT, first information corresponding to a first Public Land Mobile Network Identity (PLMN ID) associated with the first RAT and at least one first inter-RAT (IRAT) frequency, the at least one first IRAT frequency being associated with the first RAT;

storing the first information corresponding to the first PLMN ID in a database of the UE;

detecting an occurrence of one or more first events indicating that the UE is required to leave the first RAT and camp on another RAT;

based on detecting the occurrence of the one or more first events, triggering a first timer associated with a first frequency of the at least one first IRAT frequency, and performing the cell search operation corresponding to the first PLMN ID based on the stored first information to camp the UE on the second RAT;

deleting the first frequency from the database after expiration of the first timer; and based on a corresponding IRAT frequency being stored in the database, triggering a second timer for the corresponding IRAT frequency of the at least one first IRAT frequency corresponding to a PLMN ID among the one or more PLMN IDs.

16. The non-transitory computer readable medium of claim 15, wherein the acquiring the first information comprises:

determining whether system information associated with the at least one first IRAT frequency is scheduled on the first RAT; and acquiring the first information based on determining that the UE is camped on the first RAT and the system information associated with the at least one first IRAT frequency is scheduled on the first RAT.

17. The non-transitory computer readable medium of claim 15, wherein the method further comprises:

detecting an occurrence of one or more second events indicating a change in a UE location;

based on detecting the occurrence of the one or more second events, acquiring second information corresponding to a second PLMN ID associated with the second RAT and at least one second IRAT frequency, the at least one second IRAT frequency being associated with the second RAT and on which camping the UE is supported;

validating the second information and storing the validated second information in the database; and updating the database based on a result of the validation.

18. The non-transitory computer readable medium of claim 15, wherein the method further comprises:

comparing a distance associated with the at least one first IRAT frequency with a predefined distance threshold value; and validating an entry of one or more IRAT frequencies in the database based on a result of the comparison.

* * * * *